(12) United States Patent
Ono

(10) Patent No.: US 6,261,532 B1
(45) Date of Patent: Jul. 17, 2001

(54) METHOD OF PRODUCING CARBON

(75) Inventor: Shigeki Ono, Kyoto (JP)

(73) Assignees: Research Institute of Innovative Technology for the Earth; Shimadzu Corporation, both of Kyoto (JP)

(*) Notice: Subject to any disclaimer, the term of this patent is extended or adjusted under 35 U.S.C. 154(b) by 0 days.

(21) Appl. No.: 09/274,249

(22) Filed: Mar. 23, 1999

(30) Foreign Application Priority Data

Mar. 25, 1998 (JP) .................................. 10-098419
Aug. 28, 1998 (JP) .................................. 10-242786

(51) Int. Cl.[7] ...................................... D01F 9/127

(52) U.S. Cl. .................... 423/447.3; 423/445 R

(58) Field of Search ............................ 423/447.3, 445 R; 427/249.1

(56) References Cited

U.S. PATENT DOCUMENTS 4,572,813 * 2/1986 Arakawa ............................ 423/447.3
5,780,101 * 7/1998 Nolan et al. ...................... 423/447.3

OTHER PUBLICATIONS

Patent Abstr. of Japan, No. 63159210, Pub. Jul. 1988 (Mitsubishi Heavy Ind. Ltd.).

Database WPI, Section CH, Week 9006, XP002107935, Dec. 21, 1989 (Nippon Steel Corp.).

Patent Abstr. of Japan, No. 05193920, Pub. Aug. 1993 (Hitachi Ltd.).

Database EPODOC, EPO, XP–002107945, Dec. 1997 (Chinese Academy of Metals Inst.).

* cited by examiner

*Primary Examiner*—Stuart L. Hendrickson
(74) *Attorney, Agent, or Firm*—Armstrong, Westerman, Hattori, McLeland & Naughton LLP

(57) ABSTRACT

The temperature of a catalyst is heated to 535° C. with an electric furnace for feeding hydrogen gas into a reaction tube at a flow rate of 50 cc/min. for two hours and reducing the catalyst, and thereafter reaction gas containing hydrogen and carbon dioxide in a mixing ratio of 2:1 is fed into the reaction tube. The carbon dioxide contained in the reaction gas is reduced with hydrogen by coming into contact with the catalyst, and carbon such as carbon nanotube is precipitated on the surface of the catalyst. The carbon nanotube or the like can be produced under a lower temperature and ordinary pressure with no requirement for a specific apparatus for high-temperature and high-pressure reaction.

6 Claims, 1 Drawing Sheet

METHOD OF PRODUCING CARBON

BACKGROUND OF THE INVENTION

1. Field of the Invention

The present invention relates to a method of producing high-functional carbon employed for a lithium ion battery, adsorbent, a liquid crystal material or the like.

2. Description of the Prior Art

Carbon nanotube, which is a kind of high-functional carbon, can be produced by sustaining stable arc discharge between carbon electrodes in helium gas under a high temperature and high pressure. Alternatively, carbon nanotube can be formed on the forward end of a cathode-side carbon electrode by causing dc discharge in an argon gas atmosphere.

In a known method of obtaining desired carbon having a controlled fine structure, amorphous carbon is irradiated with an electron beam in a vacuum atmosphere under the presence of an active metal or a carbon material is irradiated with an electron beam accelerated at a voltage exceeding a prescribed level.

In a conventional method of producing carbon nanotube, an important parameter influencing the yield thereof is the pressure of inert gas, and the internal pressure of a reactor must be kept at least 90 atm. Thus, a specific reactor is required.

The method of controlling the fine structure of carbon by irradiating the carbon material with an electron beam is unsuitable for mass production.

SUMMARY OF THE INVENTION

The objective of the present invention is to enable production of high-functional carbon such as carbon nanotube or production of carbon by controlling a fine structure under a lower temperature and ordinary pressure.

In order to produce high-functional carbon such as carbon nanotube under a lower temperature and ordinary pressure according to the present invention, reaction gas containing at least carbon dioxide and reducing gas is brought into contact with a transition metal catalyst at a reaction temperature of 400 to 900° C. for reducing the carbon dioxide contained in the reaction gas with hydrogen, thereby precipitating carbon such as carbon nanotube on the surface of the catalyst. Hydrogen or methane can be employed as the reducing gas.

When heating the transition metal catalyst to 400 to 900° C. and bringing the reaction gas containing carbon dioxide and reducing gas into contact with the catalyst, the carbon dioxide contained in the reaction gas is reduced with the reducing gas to precipitate carbon such as carbon nanotube on the surface of the catalyst.

In order to produce carbon by controlling a fine structure under a lower temperature and ordinary pressure according to the present invention, reaction gas containing a carbon compound is brought into contact with a transition metal catalyst at a reaction temperature of 400 to 900° C. for producing carbon having a different fine structure by changing the type of the catalyst or the reaction condition when precipitating carbon on the surface of the catalyst.

When heating the catalyst at 400 to 900° C. and bringing the reaction gas into contact with the transition metal catalyst for reducing the carbon compound contained in the reaction gas and precipitating carbon on the surface of the catalyst, the fine structure of the precipitated carbon is varied with the type of the catalyst or the reaction condition.

Examples of high-functional carbon are carbon nanotube, superfine carbon, nanocapsule, onion graphite, nanopolyhedron and the like.

The transition metal catalyst employed in the present invention is prepared from a transition metal (including an oxide) such as nickel (Ni) or cobalt (Co), preferably carried by a carrier such as silica or alumina. A reactor to which the present invention is applied is a fixed or fluidized bed reactor for circulating the reaction gas in contact with the catalyst. The fixed bed reactor is charged with the catalyst in a fixed state, while the fluidized bed reactor stores the catalyst in a flowable state.

According to the present invention, carbon such as carbon nanotube can be precipitated on the surface of the catalyst by bringing the reaction gas containing at least carbon dioxide and reducing gas into contact with the transition metal catalyst at the reaction temperature of 400 to 900° C. for reducing the carbon dioxide contained in the reaction gas on the catalyst. Consequently, the carbon nanotube or the like can be produced under a lower temperature and ordinary pressure with no requirement for a specific large sized apparatus.

When bringing the reaction gas containing a carbon compound into contact with the transition metal catalyst at the reaction temperature of 400 to 900° C. for precipitating carbon on the surface of the catalyst, the fine structure of carbon can be controlled under a lower temperature and ordinary pressure while enabling mass production by changing the type of the catalyst or the reaction condition.

The foregoing along with other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
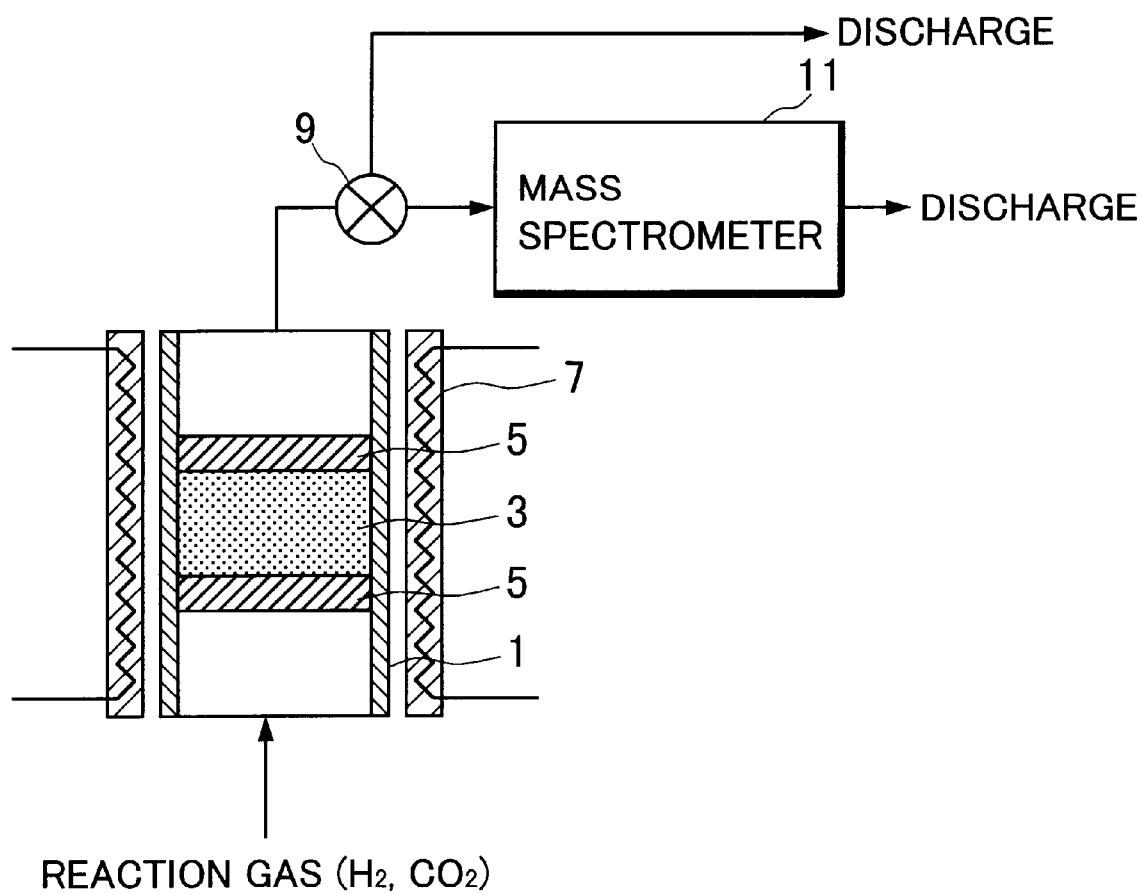
FIG. 1 schematically illustrates a carbon precipitation apparatus to which the present invention is applied.

FIG. 1 schematically illustrates a carbon precipitation apparatus to which the present invention is applied.

A quartz reaction tube 1 of 6 mm in inner diameter and 30 cm in length is charged with a catalyst 3 in the range of about 3 cm around its center. The reaction tube 1 is further charged with glass wool 5, 5 on both sides of the catalyst 3 for holding the catalyst 3. An electric furnace 7 is provided around the reaction tube 1 for heating the catalyst 3.

The reaction tube 1 is supplied with reaction gas containing hydrogen and carbon dioxide from one opening thereof. Gas is discharged from another opening of the reaction tube 1 through a valve 9. The components of the gas are detected by switching the valve 9 and feeding the discharge gas to a mass spectrometer 11 provided as a detection part.

EXAMPLE 1

Example 1 is now described as follows with reference to FIG. 1.

The reaction tube 1 was charged with granular Ni/SiO$_2$ (Ni: 50 wt %) composed Ni carried by silica, prepared by an alkoxide method, as the catalyst 3. The catalyst 3 was heated to a temperature of 535° C. with the electric furnace 7, and hydrogen gas was fed into the reaction tube 1 at a flow rate of 50 cc/min. for two hours as a pretreatment, for reducing the catalyst 3.

Then, reaction gas containing hydrogen and carbon dioxide in a mixing ratio of 2:1 was fed into the reaction tube 1. The carbon dioxide contained in the reaction gas was reduced with hydrogen by coming into contact with the catalyst 3, and carbon was precipitated on the surface of the catalyst 3. After the reaction, the temperature of the catalyst 3 was 540° C.

In Example 1, the reaction gas contained hydrogen, carbon dioxide, methane, carbon monoxide and water after the reaction. The reaction ratio obtained from the difference between the quantities of the carbon dioxide contained in the reaction gas before and after the reaction was 40%.

After the reaction, the carbon precipitated on the surface of the catalyst 3 was observed with a scanning electron microscope (SEM) and a transmission electron microscope (TEM), to recognize that the nuclei of the generated carbon were sterically layered with carbon nanotube growing in, on he surfaces of and around the layered nuclei.

When employing a catalyst carrying Co in place of the catalyst 3 arrying Ni, the crystallinity of formed carbon was reduced although the eaction ratio was increased to about 50%.

EXAMPLE 2

In Example 2, it was possible to produce superfine carbon of several 10 nm in size by changing the mixing ratio of carbon dioxide and hydrogen contained in the reaction gas and the temperature of the catalyst 3. Superfine carbon is employed for a tire, a battery, an adsorbent or the like. While superfine carbon is generally produced by thennally decomposing hydrocarbon under a high temperature, the production steps are disadvantageously complicated with requirement for a large-sized apparatus.

The method of producing superfine carbon is described with reference to FIG. 1. The catalyst 3 was prepared from $Ni/SiO_2$, similarly to Example 1.

The catalyst 3 was heated to a temperature of 600° C. with the electric furnace 7, and hydrogen gas was fed into the reaction tube 1 at a flow rate of 50 cc/min. for two hours as a pretreatment, for reducing the catalyst 3.

Then, reaction gas containing hydrogen and carbon dioxide in a mixing ratio of 3:1 was fed into the reaction tube 1 while maintaining the temperature of the catalyst 3 at 600° C. The carbon dioxide contained in the reaction gas was reduced with hydrogen by coming into contact with the catalyst 3, and carbon such as superfine carbon was precipitated on the surface of the catalyst 3.

In Example 2, the reaction gas contained hydrogen, carbon dioxide, methane, carbon monoxide and water after the reaction. The reaction ratio obtained from the difference between the quantities of the carbon dioxide contained in the reaction gas before and after the reaction was 38%.

After the reaction, the carbon precipitated on the surface of the catalyst 3 was observed with an SEM and a TEM, to recognize precipitation of superfine carbon.

When employing a catalyst carrying Co in place of the catalyst 3 carrying Ni, the crystallinity of formed carbon was reduced although the reaction ratio was increased to about 45%.

EXAMPLE 3

As Example 3, a method of controlling the fine structure of a produced carbon is described with reference to FIG. 1.

The reaction tube 1 was charged with granular $Ni/SiO_2$ (Ni: 50 wt %) of about 150 mg prepared by a sol-gel method and carried by silica as the catalyst 3. Carbon was precipitated under the same pretreatment, the reaction condition for carbon precipitation and reaction gas composition as those in Example 1.

In Example 3, the reaction gas contained hydrogen, carbon dioxide, methane, carbon monoxide and water after the reaction. The reaction ratio obtained from the difference between the quantities of the carbon dioxide contained in the reaction gas before and after the reaction was about 40%. After the reaction, the carbon precipitated on the surface of the catalyst 3 was observed with a TEM, to clearly observe lattices with partial formation of onion graphite and nanopolyhedron.

EXAMPLE 4

In Example 4, another method of controlling the fine structure of a produced carbon is described with reference to FIG. 1.

The reaction tube 1 was charged with granular $Co/SiO_2$ (Co: 50 wt %) of about 150 mg prepared by a sol-gel method and carried by silica as the catalyst 3. Carbon was precipitated under the same pretreatment, reaction condition for carbon precipitation and reaction gas composition as those in Example 1.

Also in Example 4, the reaction gas contained hydrogen, carbon dioxide, methane, carbon monoxide and water after the reaction. The reaction ratio obtained from the difference between the quantities of the carbon dioxide contained in the reaction gas before and after the reaction was about 40%.

After the reaction, the carbon precipitated on the surface of the catalyst 3 was observed with a TEM, to find that lattices were disordered and the quality of the carbon was inferior as compared with Example 3.

The catalyst employed in the present invention is not restricted to the above but can alternatively be prepared from a metal or a metal oxide other than the above. The catalyst preparation method is not restricted to the above either but the catalyst can be prepared by an impregnation method, for example. When employing a catalyst prepared by an impregnation method, formed carbon has a fine structure similar to that in Example 4.

Further, the present invention is not restricted to the reaction between carbon dioxide and hydrogen caused in Examples for forming carbon and water, but reaction between methane and carbon dioxide for forming carbon and water or decomposition of methane is also employable.

Although the present invention has been described and illustrated in detail, it is clearly understood that the same is by way of illustration and example only and is not to be taken by way of limitation, as the spirit and scope of the present invention is limited only by the terms of the appended claims.

I claim:
1. A method of producing carbon by bringing reaction gas containing carbon dioxide, and reducing gas in an amount sufficient to reduce all of said carbon dioxide, into contact with a transition metal catalyst at a reaction temperature of 400 to 900° C. and directly reducing said carbon dioxide to form carbon thereby precipitating carbon on the surface of said catalyst.
2. The method of producing carbon in accordance with claim 1, wherein
said reducing gas is hydrogen.
3. The method of producing carbon in accordance with claim 1, wherein said transition metal catalyst is granular $Ni/SiO_2$ which is composed of Ni carried by silica.

4. The method of producing carbon in accordance with claim 1, wherein said transition metal catalyst is granular $Co/SiO_2$ which is composed of Co carried by silica.

5. A method of producing carbon by bringing reaction gas containing carbon dioxide, and reducing gas in an amount sufficient to reduce all of said carbon dioxide, into contact with a transition metal catalyst at a prescribed reaction temperature of 400 to 900° C. thereby precipitating carbon on the surface of said catalyst.

6. The method of producing carbon in accordance with claim 5, wherein said catalyst is selected from granular $Ni/SiO_2$ and $Co/SiO_2$.

\* \* \* \* \*